(12) United States Patent
Boriani et al.

(10) Patent No.: US 7,108,122 B2
(45) Date of Patent: Sep. 19, 2006

(54) METHOD AND MACHINE FOR TRANSFERRING PACKETS

(75) Inventors: Silvano Boriani, Bologna (IT); Fiorenzo Draghetti, Medicina (IT)

(73) Assignee: G.D Societa' Per Azioni, Bologna (IT)

( * ) Notice: Subject to any disclaimer, the term of this patent is extended or adjusted under 35 U.S.C. 154(b) by 0 days.

(21) Appl. No.: 10/794,773

(22) Filed: Mar. 5, 2004

(65) Prior Publication Data
US 2004/0238325 A1 Dec. 2, 2004

(30) Foreign Application Priority Data
Mar. 10, 2003 (IT) .......................... BO2003A0129

(51) Int. Cl.
*B65G 47/04* (2006.01)
(52) U.S. Cl. .................. 198/468.8; 198/463.2
(58) Field of Classification Search ............ 198/468.8, 198/575, 577, 597, 598, 604, 463.2, 456, 198/457.01
See application file for complete search history.

(56) References Cited

U.S. PATENT DOCUMENTS

| | | | |
|---|---|---|---|
| 4,883,163 A | 11/1989 | Gamberini et al. | |
| 5,873,453 A * | 2/1999 | Vetter | 198/468.8 |
| 6,092,641 A * | 7/2000 | Draghetti | 198/406 |
| 6,105,340 A * | 8/2000 | Draghetti | 53/415 |
| 6,332,530 B1 * | 12/2001 | Grossmann et al. | 198/468.8 |

FOREIGN PATENT DOCUMENTS

| | | |
|---|---|---|
| DE | 3840394 | 6/1989 |
| EP | 0519400 | 12/1992 |
| EP | 0987180 | 3/2000 |

* cited by examiner

*Primary Examiner*—James R. Bidwell
(74) *Attorney, Agent, or Firm*—Ladas & Parry LLP

(57) ABSTRACT

A method and machine for transferring packets, whereby, as a continuous line of packets is fed in a first direction, the first packet in the line is transferred in a second direction perpendicular to the first direction, while the line and the first packet continue travelling in the first direction; the first packet is subsequently conveyed in the second direction along an output path.

22 Claims, 5 Drawing Sheets

METHOD AND MACHINE FOR TRANSFERRING PACKETS

FIELD OF THE INVENTION

The present invention relates to a method and machine for transferring packets.

The present invention may be used to advantage in the packing of cigarettes, to which the following description refers purely by way of example.

BACKGROUND OF THE INVENTION

In automatic machines for transferring packets of cigarettes, a continuous line of packets of cigarettes is fed in a feed direction to a transfer station. The line of packets travelling in the feed direction is arrested when the lead packet, i.e. the first packet in the line, intercepts an end wall at the transfer station; at which point, the lead packet is transferred in a transfer direction substantially perpendicular to the feed direction to separate the lead packet from the line; and, once transferred, the lead packet is further conveyed along an output path. The above operations are obviously repeated for each packet occupying the lead position in the line.

In modern automatic machines, the line of packets is fed to the transfer station at relatively high speed to permit high output rates and prevent gaps forming between successive packets in the line. As a result, the lead packet contacts the end wall with fairly considerable force capable of damaging the lead packet. Moreover, as it is being fed in the transfer direction, the lead packet slides against the end wall, thus possibly undergoing further damage.

SUMMARY OF THE INVENTION

It is an object of the present invention to provide a method of transferring packets, designed to eliminate the aforementioned drawbacks, and which at the same time is cheap and easy to implement.

According to the present invention, there is provided a method of transferring packets, as claimed in claim 1 and, preferably, in any one of the following claims depending directly or indirectly on claim 1.

According to the present invention, there is also provided a machine for transferring packets, as claimed in claim 15 and, preferably, in any one of the following claims depending directly or indirectly on claim 15.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
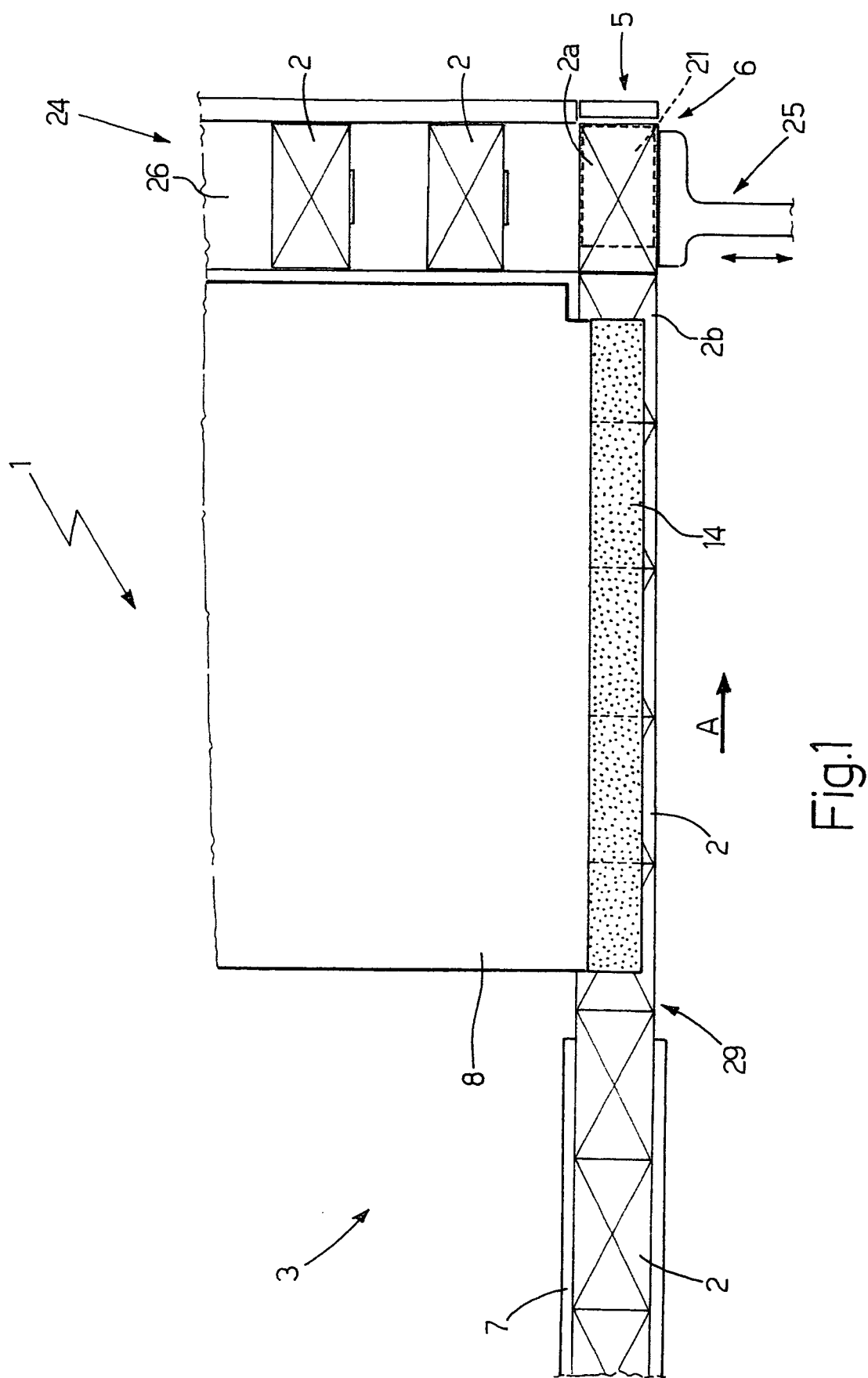
FIG. 1 shows a plan view of a machine for transferring packets of cigarettes in accordance with the present invention.

Number 1 in FIG. 1 indicates as a whole a machine for transferring substantially parallelepiped-shaped packets 2, in particular packets of cigarettes, from a known packing machine not shown.

Figure 2:
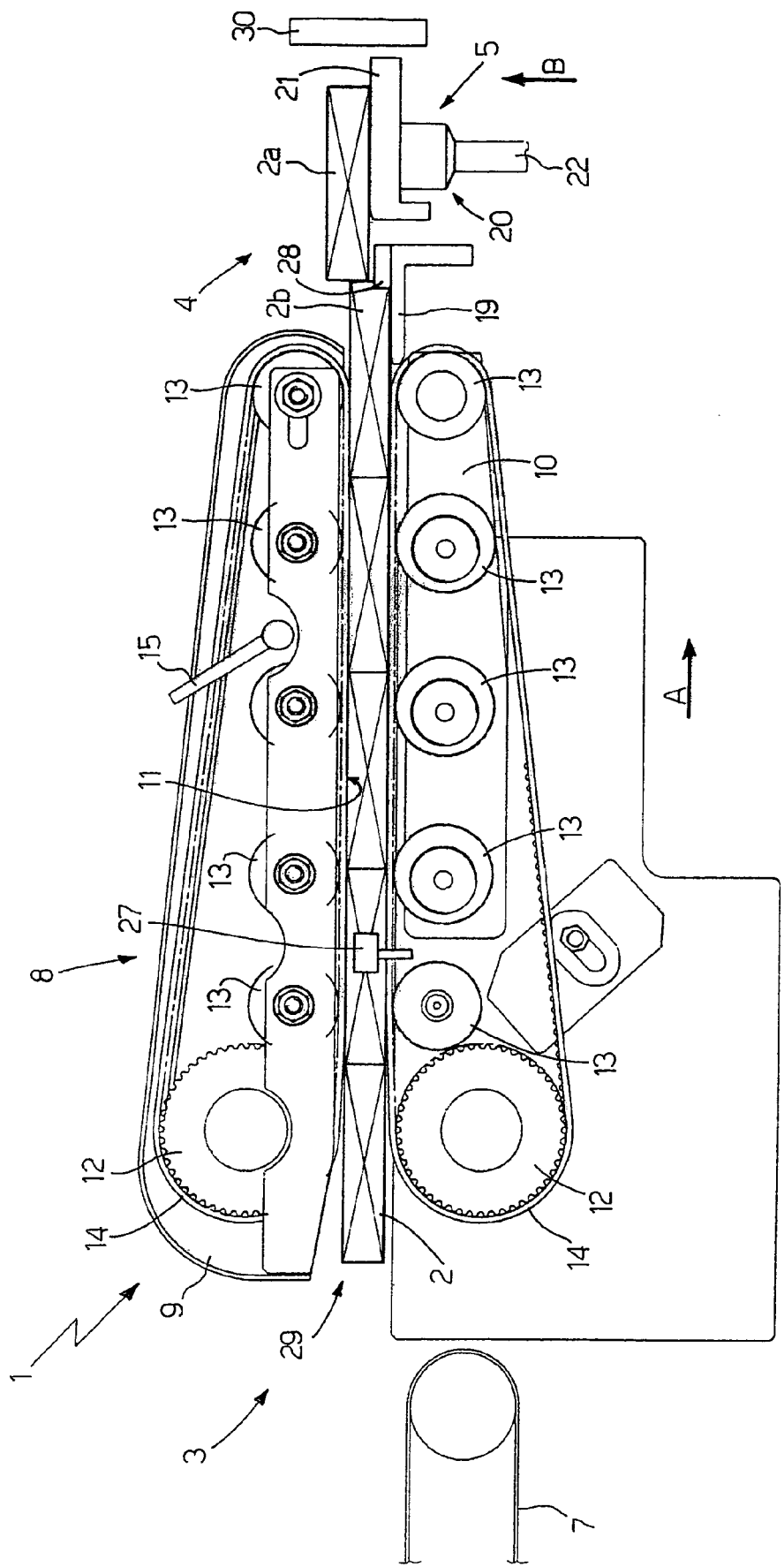
FIG. 2 shows a larger-scale side view of a detail of the FIG. 1 machine.
Figure 3:
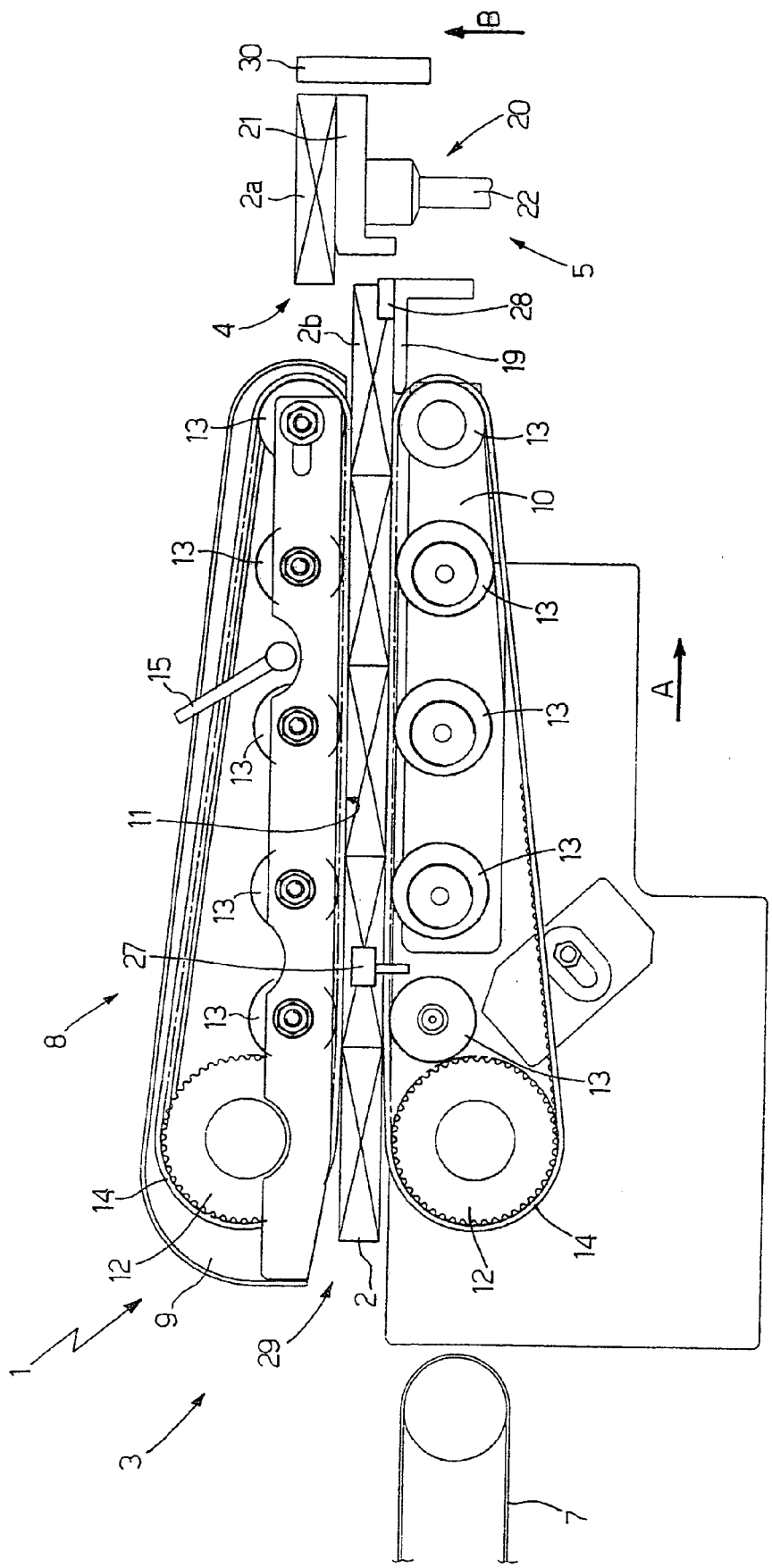
FIG. 3 shows the FIG. 2 detail in a subsequent operating position.

With reference to FIGS. 1, 2 and 3, machine 1 comprises a feed unit 3 for feeding packets 2 horizontally in a feed direction A to a transfer station 4; and a transfer unit 5 for transferring at least one packet 2a, located at transfer station 4, to an output station 6 in a transfer direction B substantially perpendicular to feed direction A.

Feed unit 3 comprises a conveyor belt 7 which feeds packets 2 to a further two-belt conveyor 8. Conveyor 8 feeds the packets to transfer station 4, is located downstream from conveyor belt 7, and comprises a top conveying assembly 9 and a bottom conveying assembly 10 defining, in between, a feed channel 11 for packets 2.

Each conveying assembly 9, 10 comprises a drive pulley 12, and a number of—in the example shown, five—idle pulleys 13; and the respective pulleys 12 and 13 of the two assemblies are located on opposite sides of channel 11.

Each conveying assembly 9, 10 comprises a belt 14 looped about relative pulleys 12 and 13 and which engages the walls of packets 2 to feed packets 2 in feed direction A.

Conveying assembly 9 has a known guide device (not shown) for raising conveying assembly 9 to adjust the distance between it and conveying assembly 10; and a known locking device (not shown) operated by a lever 15 to lock conveying assembly 9 in a given position.

Conveyor 8 comprises an electric motor 16 for driving pulleys 12 by means of a belt 17 (shown schematically in FIG. 4) which is kept taut by a tension pulley 18.

Finally, conveyor 8 comprises a slide plate 19 located immediately downstream from conveying assembly 10 and having a top slide surface substantially coplanar with a bottom surface of channel 11.

Figure 4:
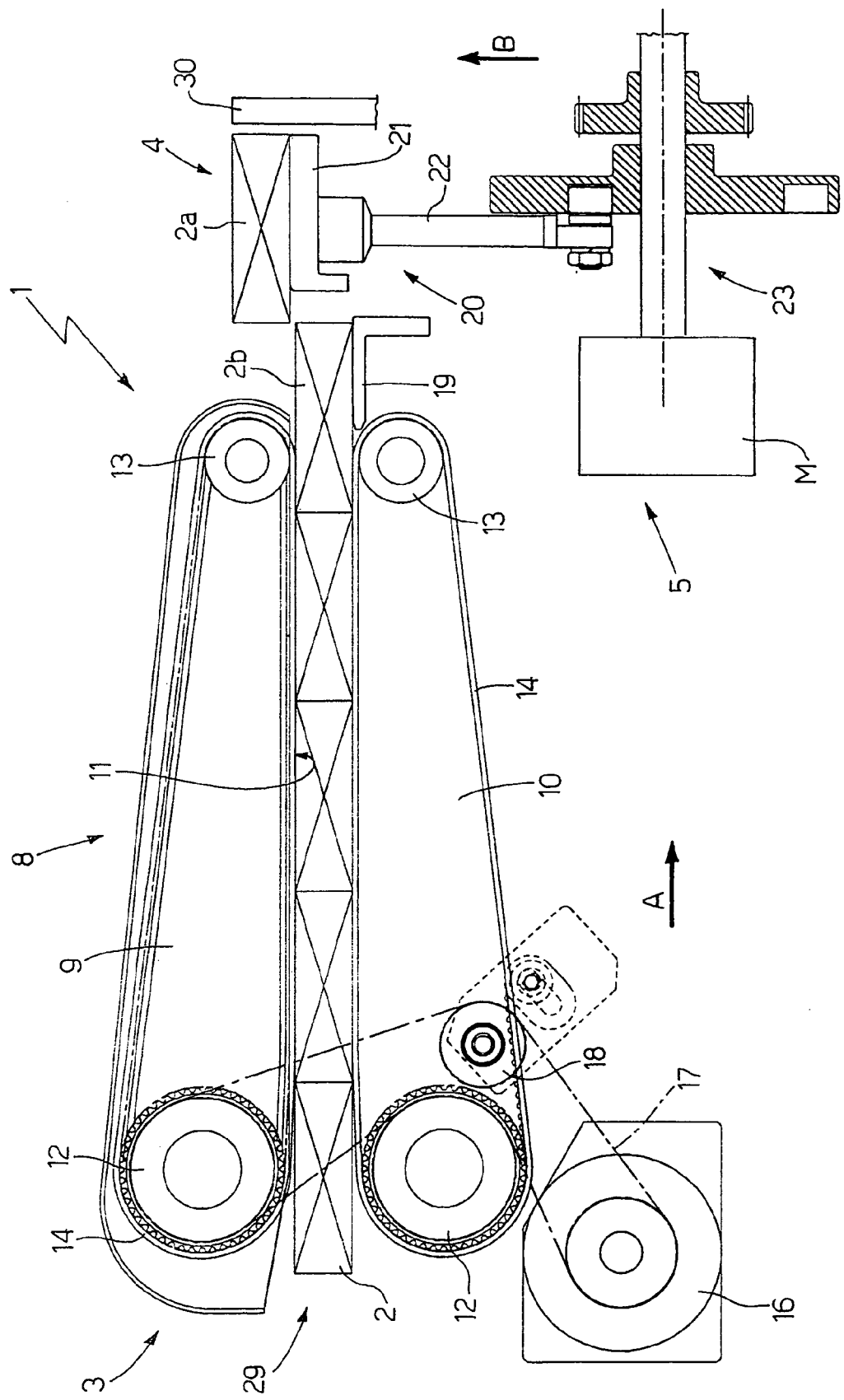
FIG. 4 shows a longitudinal section of FIG. 3 with parts removed for clarity.

Transfer unit 5 comprises a lifter 20, in turn comprising a lift head 21; and a rod 22, one end of which is integral with lift head 21, and the other end of which is connected by a cam follower to a cam 23 rotated about a respective axis by a motor M (FIG. 4). As can be seen, the length, in feed direction A, of lift head 21 is shorter than the length, in feed direction A, of the wall of packet 2a.

In actual use, lift head 21 intercepts packet 2a at transfer station 4, and moves upwards in transfer direction B to transfer it to output station 6.

Machine 1 also comprises a conveying unit 24 located downstream from transfer unit 5 to convey packets 2a along an output path from output station 6. Unit 24 comprises a push device 25 for feeding packet 2a at output station 6 onto a belt conveyor 26.

Finally, machine 1 comprises a sensor 27 for detecting any gaps between packets 2 inside channel 11; and a sensor 28 for detecting the position of a second packet 2b behind packet 2a in feed direction A. Sensors 27 and 28 are connected to a known control unit (not shown) which controls the speed of motor 16 as a function of the position of lift head 21. The speed of motor 16 is also adjusted on the basis of the position of packet 2b determined by sensor 28. More specifically, if packet 2b is ahead with respect to a given predetermined position, motor 16 is slowed down accordingly. When sensor 27 detects, in use, a gap between packets 2 in channel 11, the known control unit (not shown) arrests motor 16 and motor M.

In use, the individual incoming packets from the known packing machine (not shown) are fed by conveyor belt 7 to conveyor 8 at a constant speed greater than the maximum travelling speed of conveyor 8. Upstream from conveyor 8 and inside channel 11, a continuous line 29 of packets 2 is formed, and of which packet 2a is the lead packet in feed direction A. On the basis of the length of line 29, which is determined by known sensors (not shown), the known control unit (not shown) adjusts the speed of motor M of transfer unit 5 so that the longer line 29 is, the greater the speed of motor M of transfer unit 5 is.

The line 29 of packets 2 inside channel 11 is fed by conveyor 8 to transfer station 4 in feed direction A. When packet 2a is positioned correctly at transfer station 4 so as to be partly supported by lift head 21, head 21 is moved vertically upwards in transfer direction B. As packet 2a is being raised, line 29 continues moving so that packet 2b pushes packet 2a in feed direction A until packet 2a reaches output station 6 and is separated completely from line 29.

It should be stressed that the movements of lift head 21 and the speed at which conveyor 8 conveys line 29 are so regulated that packet 2a never comes into contact with an end wall 30 located at the end of transfer station 4 in feed direction A.

At this point, push device 25 is operated so that packet 2a at the output station is fed along the output path defined at least partly by conveyor 26. Lift head 21 moves back and forth in transfer direction B so as to move down after feeding packet 2a to output station 6.

In this connection, it should be stressed that the movements of lift head 21 and the travelling speed of line 29 are so regulated that head 21 does not interfere with the travel of line 29 inside transfer station 4. More specifically, the travelling speed of line 29 in feed direction A varies as a function of the position of lift head 21, and therefore in a definite manner with time.

Figure 5:
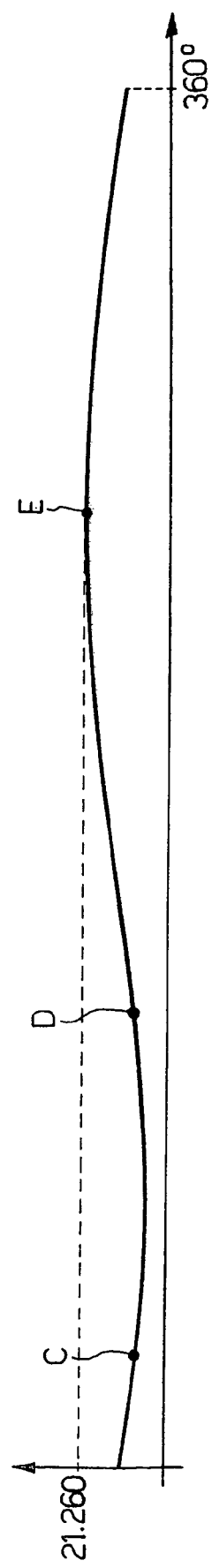
FIG. 5 shows a graph of operation of the FIG. 1 machine.

The FIG. 5 graph shows, purely by way of example, the travelling speed of line 29 (y axis) as a function of the machine angle of transfer unit 5 (x axis). In FIG. 5, portion C-D represents the downward movement of lift head 21, point E represents the instant in which head 21 begins moving upwards, and portion E-C represents the upward movement of head 21 (i.e. transfer of packet 2a in transfer direction B).

The travelling speed of line 29 along portion C-D is relatively low (in particular, less than or equal to the speed along portion D-C) and reaches a maximum when lift head 21 is positioned beneath transfer station 4. Head 21 therefore has enough time to move downwards without coming into contact with line 29, and without interfering with the movement of line 29 in feed direction A. The travelling speed of line 29 typically slows down along portion E-C.

It should be pointed out that the travelling speed of line 29 in feed direction A is also preferably varied as a function of the position of packet 2b as head 21 begins moving upwards. For which purpose, the real position of packet 2b is determined the instant packet 2a begins to be lifted, and is compared with an ideal theoretical position. When packet 2b falls short of the ideal position, the travelling speed is increased slightly with respect to that shown by way of example in FIG. 5; and, conversely, if packet 2b is ahead of the ideal position, the travelling speed is reduced slightly with respect to that shown by way of example in FIG. 5.

The invention claimed is:

1. A method of transferring packets; the method comprising a feed step of feeding a continuous line (29) of packets (2) at a traveling speed of other than zero in a first direction (A);

a transfer step of transferring at least one lead packet (2a) of said line (29) in said first direction (A) in a second direction (B) substantially perpendicular to the first direction (A) by means of mechanical transfer means (5), so as to separate said lead packet (2a) from the line (29); wherein said transfer step is performed during said feed step;

a conveying step subsequent to the transfer step, to convey the lead packet (2a) along an output path; and a varying step to vary said traveling speed of the continuous line (29) of packets (2) as a function of the movements of the mechanical transfer means (5);

wherein the mechanical transfer means (5) has a lift head (21) which is moved up and down, and during the conveying step lifts the lead packet (2a) in the second direction (B) for conveying along the output path whereafter the lift head (21) returns to a lowered position beneath the line of packets for subsequently moving upwards again to convey the next lead packet (2a) in the line; the traveling speed of the continuous line (29) is varied in the first direction (A) as a function of the position of the lift head (21) such that during downward movement of the lift head (21) the traveling speed of the continuous line (29) is reduced whereas when the lift head (21) begins moving upwards the traveling speed of the continuous line (29) is increased.

2. A method as claimed in claim 1, wherein said first direction (A) is a substantially horizontal direction.

3. A method as claimed in claim 2, wherein said second direction (B) is a substantially vertical upward direction.

4. A method as claimed in claim 1, wherein the traveling speed varies with time.

5. A method as claimed in claim 1, wherein the lead packet (2a) is transferred in said second direction (B) by said mechanical transfer means (5) which engages said lead packet (2a) at a transfer station (4); the movements of the mechanical transfer means (5) and the traveling speed being so regulated that the mechanical transfer means (5) do not interfere with travel of the line (29) of packets (2) in said first direction (A).

6. A method as claimed in claim 5, wherein said mechanical transfer means (5) comprises a push member (21) movable back and forth in the second direction (B), and which engages a wall of the lead packet (2a) to transfer the lead packet (2a) in the second direction (B).

7. A method as claimed in claim 1, wherein said feed step includes a first and a second feed substep (D-C, C-D) alternating with each other; the traveling speed during the first feed substep (D-C) being at least equal to the traveling speed during the second feed substep (C-D); and the transfer step (E-C) being performed during said first feed substep (D-C).

8. A method as claimed in claim 5, wherein, during said transfer step (E-C) and said second feed substep (C-D), the mechanical transfer means (5) partly occupies the transfer station (4), so that the line (29) of packets (2) can partly engage the transfer station (4).

9. A method as claimed in claim 8, wherein, during the second feed substep (C-D), the mechanical transfer means (5) disengages the transfer station (4) so as not to interfere with travel of the line (29) of packets (2), and so that, at the end of the second feed substep (C-D), the mechanical transfer means (5) are located outside the transfer station (4).

10. A method as claimed in claim 7, wherein the traveling speed varies during the first feed substep (D-C), and reaches a minimum value at the end of the transfer step (E-C) and at the start of the second feed substep (C-D); the end of the transfer step (E-C) and the start of the second feed substep (C-D) being simultaneous.

11. A method as claimed in claim 7, wherein the traveling speed varies during the second feed substep, and reaches a maximum value (E) at the end of the first feed substep (D-C) and at the end of the transfer step (E-C); the end of the first feed substep (D-C) and the end of the transfer step (E-C) being simultaneous.

12. A method as claimed in claim 4, wherein the traveling speed varies with time in a substantially sinusoidal pattern.

13. A method as claimed in claim 5, wherein the traveling speed decreases with time during said transfer step (E-C).

14. A method as claimed in claim 1, wherein, during at least part of the transfer step, the packet travels in the first direction (A).

15. A machine for transferring packets; the machine comprising
  feed means (3) for feeding a continuous line (29) of packets in a first direction (A) at a traveling speed of other than zero;
  mechanical transfer means (5) which engages at least one lead packet (2a) of said line (29) in said first direction (A) at a transfer station (4), and transfers the lead packet (2a) in a second direction (B) substantially perpendicular to the first direction (A), so as to separate the lead packet (2a) from the line (29); wherein the feed means (3) feeds the line (29) of packets into the transfer station (4) while, in use, the mechanical transfer means (5) partly occupy the transfer station (4); and
  a control unit for controlling said feed means (3) so as to vary said traveling speed of the continuous line (29) of packets (2) as a function of the movements of the mechanical transfer means (5); wherein the movements of the mechanical transfer means (5) and said traveling speed are so regulated, in use, that the mechanical transfer means (5) does not interfere with travel of the line (29) of packets (2) in the first direction (A);
  wherein the mechanical transfer means (5) includes a lift head (21) movable up and down in the second direction (B) between a position below the line (29) of packets and a position above the line (29) of packets; the traveling speed of the line (29) is reduced during downward movement of said lift head (21) and increased when the lift head (21) begins moving upwards.

16. A machine as claimed in claim 15, wherein the first direction (A) is substantially horizontal.

17. A machine as claimed in claim 16, wherein the second direction (B) is substantially vertical.

18. A machine as claimed in claim 16, wherein the mechanical transfer means (5) transfer the lead packet (2a) to an output station (6); the machine comprising an output conveyor (26), and push means (25) for transferring the lead packet (2a) at the output station (6) to the output conveyor (26).

19. A machine as claimed in claim 15, and further comprising detecting means (28) for detecting the position of a second packet (2b) located, in use, directly behind said lead packet (2a) in a traveling direction of the packets (2); the detecting means (28) being connected to the control unit, which varies the traveling speed as a function of the position of the second packet (2b).

20. A machine as claimed in claim 15, wherein said mechanical transfer means comprises a push member (21), which engages a wall of the lead packet (2a) to transfer the lead packet (2a) in the second direction (B); and actuating means (23, M) for moving the push member (21) back and forth through the transfer station in said second direction (B).

21. A machine as claimed in claim 20, wherein the push member (21) engages a wall of the lead packet (2a), and is of a length, in the first direction (A), shorter than the length, in the first direction (A), of the wall of the packet (2).

22. A method of transferring packets; the method comprising
  a feed step of feeding a continuous line (29) of packets (2) at a traveling speed of other than zero in a first direction (A);
  a transfer step of transferring at least one lead packet (2a) of said line (29) in said first direction (A) in a second direction (B) substantially perpendicular to the first direction (A) by means of mechanical transfer means (5), so as to separate said lead packet (2a) from the line (29); wherein said transfer step is performed during said feed step;
  a conveying step subsequent to the transfer step, to convey the lead packet (2a) along an output path; and
  a varying step to vary said traveling speed of the continuous line (29) of packets (2) as a function of the movements of the mechanical transfer means (5); wherein the traveling speed varies with time in a substantially sinusoidal pattern.

* * * * *